(12) United States Patent
Tonnvik et al.

(10) Patent No.: US 6,569,933 B1
(45) Date of Patent: May 27, 2003

(54) GRANULATE COMPOSITION OF ANTIBLOCKING AGENTS AND ADDITIVES FOR POLYMER PRODUCTION

(75) Inventors: Mats Tonnvik, Rydebaeck (SE); Andreas Sturm, Osthofen (DE); Gonda van Essche, Worms (DE); Andreas Schmidt, Mannheim (DE)

(73) Assignee: W. R. Grace & Co.-Conn., Columbia, MD (US)

( * ) Notice: Subject to any disclaimer, the term of this patent is extended or adjusted under 35 U.S.C. 154(b) by 0 days.

(21) Appl. No.: 09/673,875

(22) PCT Filed: Apr. 16, 1999

(86) PCT No.: PCT/EP99/02559

§ 371 (c)(1),
(2), (4) Date: Dec. 11, 2000

(87) PCT Pub. No.: WO99/54396

PCT Pub. Date: Oct. 28, 1999

(30) Foreign Application Priority Data

Apr. 19, 1998 (DE) .......................... 198 17 257

(51) Int. Cl.$^7$ .............................. C08K 7/16; C08K 3/34
(52) U.S. Cl. ...................... 524/444; 523/223; 257/397; 524/445; 524/446; 524/448
(58) Field of Search .................. 523/223; 524/444, 524/445, 446, 448; 252/397

(56) References Cited

U.S. PATENT DOCUMENTS

| | | | |
|---|---|---|---|
| 3,266,924 A | 8/1966 | Haeske et al. ............... 106/308 |
| 4,169,826 A | 10/1979 | Gilbert et al. | |
| 4,174,330 A | 11/1979 | Gilbert et al. ............. 260/28.5 |
| 4,446,086 A | 5/1984 | Molenaar et al. ........... 264/118 |
| 4,675,122 A | 6/1987 | Lüers et al. .................. 252/28 |
| 5,053,444 A | 10/1991 | Trotoir ........................ 523/351 |
| 5,844,042 A | 12/1998 | Neri et al. | |

FOREIGN PATENT DOCUMENTS

| | | | |
|---|---|---|---|
| CA | 2014005 | 10/1990 | ........... C08L/57/00 |
| DE | 2124040 | 11/1972 | ........... C08F/29/14 |
| DE | 2352999 | 4/1975 | ............. B29B/5/02 |
| DE | 3219298 | 11/1983 | ............. C08J/3/12 |
| DE | 19805358 | 8/1989 | ............. C08K/13/02 |
| DE | 294035 | 9/1991 | ........... C08K/13/00 |
| DE | 4424775 | 1/1996 | ............. C08K/3/34 |
| EP | 0 278 579 | 2/1988 | ............. C08K/5/00 |
| EP | 259960 | 3/1988 | ............... C08J/3/22 |
| EP | 149601 | 7/1990 | ............. C08K/5/20 |
| EP | 513824 | 11/1992 | ............. C11D/11/00 |
| EP | 514784 | 11/1992 | ............. C08K/5/13 |
| EP | 725109 | 8/1996 | ........... C08K/13/02 |
| EP | 565184 | 6/1998 | ............... C08J/3/22 |
| GB | 1238118 | 7/1971 | |
| GB | 2025980 | 6/1980 | ............. C08J/3/20 |
| JP | 59-4460 | 7/1981 | ............. C09K/3/14 |
| JP | 3-33162 | 2/1991 | ......... C08L/101/00 |
| JP | 5-69865 | 10/1993 | ......... C08L/101/00 |
| WO | WO 96/01289 | 1/1996 | ............. C08K/3/36 |
| WO | WO 96/22328 | 7/1996 | ............. C08L/23/10 |
| WO | WO 96/34062 | 10/1996 | ............. C09C/1/30 |

OTHER PUBLICATIONS

"The International Conference on Additives for Polyolefins"; Feb. 23–25, 1998; Presented by the South Texas Section & Polymer Modifiers and Additives Division.

Primary Examiner—Kriellion A. Sanders
(74) Attorney, Agent, or Firm—William D. Bunch

(57) ABSTRACT

The invention comprises a granulate comprising a) a micronized silicic acid gel (A) with an average particle size from 2 to 15 microns, a specific pore volume from 0.3 to 2.0 ml/g, a specific surface (BET) from 200 to 1000 m$^2$/g, in a concentration from 5 to 60% by weight or b) a hydrated or dehydrated aluminosilicate (B) which contains sodium and/or potassium and/or calcium cations, with a particle size between 1 and 25 microns in a concentration from 5 to 75% by weight and c) an organic additive composition (C) in a concentration from 25 to 95% by weight, but at least 5% more (measured by the oil adsorption process) than that which is necessary to fill all pores of the silicic acid and the spaces between the silicic acid particles and the aluminosilicate and the aluminosilicate particles.

6 Claims, No Drawings

GRANULATE COMPOSITION OF ANTIBLOCKING AGENTS AND ADDITIVES FOR POLYMER PRODUCTION

This invention relates to a new type of additive for polymer film production, and especially a granulate which contains
   a) one or more additives for polymer film production and
   b) a micronized silicic acid or an aluminosilicate.

This granulate is suitable as an additive for example in the processing of polyolefins and the production of polyolefin films.

It is known that in the production of polyolefin films several additives are necessary to benefit the various properties of the finished films. They are for example
   i) antiblocking agents, for example, fine-particle diatomaceous earth, silicic acid, silica gel;
   ii) lubricants, such as for example fatty acid amides and especially oleic acid amide and erucic acid amide;
   iii) primary antioxidants from the group of sterically hindered phenols, secondary aryl amines, etc.;
   iv) secondary antioxidants from the group of phosphorus compositions, thioesters, hydroxylamines, etc.;
   v) antistatic agents from the group of ammonium salts, glycerin esters, anionic compounds, etc.;
   vi) light stabilizers from the group of benzophenones, benzotriazols, "HALS" ("Sterically Hindered Amines Light Stabilizers"), etc.;
   vii) flame retardants from the group of halogenated organic compounds, metal hydrates, etc.;
   viii) softeners from the group of phthalates, monocarboxylic acid esters, aliphatic dicarboxylic acid esters, etc.

Granulates of pure organic additives are already known. At the same time combinations of micronized silicic acids or aluminosilicates as antiblocking agents with organic additives cause poor dispersability when granulation processes according to the prior art are used, for example, compacting in molds or compacting by nozzles (cold pressing).

Japanese patent HEI 569865 for example describes an additive-pellet composition which comprises spherical pellets of amorphous silicoaluminate and organic additives. Organic components can be for example lubricants, antistatic agents and softeners, UV stabilizers and antioxidants, etc. This patent application however is not concerned with synthetic, amorphous silicic acids or with crystalline aluminosilicates.

German patent 33 37 356 describes a combined antiblocking and lubricant concentrate, a master batch being formed with a polyolefin.

German patent 44 24 775 describes a special antiblocking agent based on silicon dioxide with a bimodal pore size distribution. This antiblocking agent is combined with lubricants such as oleic acid amid or erucic acid amide to produce polyolefin master batches.

U.S. Pat. No. 5,053,444 describes a polymer concentrate which contains as the additive aluminum oxide or silicon dioxide. Other additives are lubricants, antioxidants, UV stabilizers, antistatic agents, etc.

All these patents show that so far there has been no success in producing a free-flowing granulate which contains only synthetic, amorphous silicic acid and organic additives and which at the same time can be easily dispersed in polymers. A certain polymer for forming a master batch is always contained. This means that the additive concentrates cannot be used for just any polymer types.

U.S. Pat. No. 3 266 924 describes production of homogenous mixtures of fine particle silicic acid and fatty acid amides in a mixer. The amides are added to the silicic acid during mixing at a temperature near the melting point of the amides. This yields a powder mixture.

In view of the described defects of known additives, the object was to produce an additive that is universally suitable for many applications and polymers, which can be easily and economically used, and thus has application advantages such as good dispersability with simultaneous occurrence in granulate form.

As claimed in the invention, this object was achieved by a granulate composition which is characterized in that it
   a) consists of micronized silicic acid gel (A) with an average particle size from 2 to 15 microns, preferably 5 to 10 microns, a specific pore volume from 0.3 to 2.0 ml/g, preferably 0.5 to 1.5 ml/g, a specific surface (BET) from 200 to 1000 $m^2/g$, preferably 200 to 800 $m^2/g$, in a concentration from 5 to 60% by weight, preferably 10 to 50% by weight, especially 15 to 45% by weight, or
   b) a hydrated or dehydrated aluminosilicate (B) which contains sodium and/or potassium and/or calcium cations, with an average particle size between 1 and 25 microns in a concentration from 5 to 75% by weight, preferably 10 to 60% by weight, especially 15 to 50% by weight, and
   c) an organic additive composition (C) in a concentration from 25 to 95% by weight, preferably 40 to 90% by weight, especially 50 to 85% by weight, but at least 5% more (measured by the oil adsorption process) than that which is necessary to fill all the pores of the silicic acid and the spaces between the silicic acid particles and the aluminosilicate particles.

The composition as claimed in the invention has a dispersability in polymers which is as good as the individual components. The organic composition (C) can consist of one or more of the following components in any proportion:
   i) lubricants from the croup of fatty acid amides;
   ii) primary antioxidants from the group of sterically hindered phenols, secondary aryl amines, etc.;
   iii) secondary antioxidants from the group of phosphorus compositions, thioesters, hydroxylamines, etc.;
   iv) antistatic agents from the group of ammonium salts, glycerin esters, anionic compounds, etc.;
   v) light stabilizers from the group of benzophenones, benzotriazols, "HALS" ("Sterically Hindered Amines Light Stabilizers"), etc.;
   vi) flame retardants from the group of halogenated organic compounds, metal hydrates, etc.;
   vii) softeners from the group of phthalates, monocarboxylic acid esters, aliphatic dicarboxylic acid esters, etc.

It has now been surprisingly found that granulates with micronized silicic acid or aluminosilicates lead to good dispersability, if the inorganic components are added to a melt of the organic additives. This can be done by adding the inorganic components to a melt of the organic components produced beforehand or when a premixture of the organic and inorganic components is heated to the melting point of the organic component. The concentration of inorganic components cannot be higher than the critical pigment volume concentration, i.e. the molten organic phase must be able to fill all empty pores of the silicic acid (in the case of aluminosilicate the particle pores are too small for the organic molecules) and the interstices between the organic particles. It is necessary to have an excess of organic components to achieve a paste or liquid mass. The formation of granulates (pellets) is achieved either by spray drying of the melt or by extrusion of strands with subsequent comminution. The preferred technical approach is to use an extruder to melt the organic components and to achieve distribution of inorganic particles. The discharge of the extruder in the form of strands is cut with a means of the prior art ("hot knock-off"). Afterwards the granulate can be cooled, preferably in a fluidized bed, to prevent aggregation of the individual particles. Another possibility is that the strands are guided into a water bath and cut therein. The surface water is then removed preferably in a fluidized bed.

The advantages of this invention are:

Delivery of all additives in pelletized form with only proportioning into the extruder.

More precise proportioning of the components.

Processing in the final application does not cause any dust.

Higher bulk density of the pellets than those of the simple physical mixtures of amorphous silicic acids and additives (and therefore lower transport and production costs).

Good dispersability of additives in the polymer mass.

EXAMPLES

Example 1

Pellets of Silicic Acid and Erucic Amide

A physical mixture of 43% pure amorphous micronized silicic acid (specific pore volume 1.0 ml/g, Malvern median particle size 4.8 microns) and 57% erucic amide were proportioned volumetrically into the 6th extrusion zone of a Theyson TSK 30 twin screw extruder. The extruder was operated with a screw rotation speed of 320/min and a throughput of 6.3 kg/h. The temperature profile of the extruder was:

| Extrusion zone | Setpoint | Measured temperature/° C. |
|---|---|---|
| 6 | 25 | 36 |
| 7 | 100 | 99 |
| 8 | 100 | 102 |
| 9 | 80 | 82 |
| 10 | 20 | 48 |
| 11 | 20 | 77 |

The resulting point was 85° C. The material was pressed through an extruder nozzle with an opening of 4 mm and cooled with air before the stands were cut into pellets by a rotating blade. Dispersability was tested in example 5.

Example 2

Pellets of Silicic Acid and an Additive Composition

A premixture was produced with a 500 l Henschel mixer (type FM 500) by mixing all additives for 2.5 minutes at a rotation speed of 840/min. The composition was as follows:

| | | |
|---|---|---|
| Amorphous micronized silicic acid (specific pore volume 1.0 ml/g; Malvern median particle size 4.8 microns) | 9.31% | |
| Erucic amide (Crodamide ER) | 46.58% | Croda Universal |
| Irganox 1010 (pentaerythrityl(3-(3.5-bis (1,1-dimethylethyl)-4-hydroxyphenyl)propioniate | 23.26% | Ciba-Geigy |
| Irgaphos 168 (tris(2,4-di-tert.butylphenyl)phosphite) | 17.6% | Ciba-Geigy |
| Ca stearate type M | 8.85% | Sogis |

This premixture was metered in the first feed zone of the twin screw extruder (type Theyson DN 60) with gravimetric Brabender proportioning (90.2 kg/h). In the 4th extrusion zone an additional amount of 24.3% or 29.8 kg/h amorphous silicic acid was added. The resulting final composition was:

| | |
|---|---|
| Amorphous micronized silicic acid (specfic pore volume 1.0 ml/g; Malvern median particle size 4.8 microns) | 31.2 |
| Crodamide ER | 35.3% |
| Irqanox 1010 | 9.1% |
| Irgaphos 168 | 17.6% |
| Ca stearate | 6.7% |

The Theyson DN 60 extruder was operated with a worm rotation speed of 350/min and a total throughput of 120 kg/h and the following temperature profile:

| Extrusion zone | Setpoint | Measured temperature/° C. |
|---|---|---|
| 1 | 40 | 41 |
| 2 | 160 | 122 |
| 3 | 160 | 148 |
| 4 | 140 | 143 |
| 5 | 95 | 97 |
| 6 | 78 | 77 |
| 7 | 75 | 74 |
| 8 | 83 | 90 |
| 9 | 83 | 85 |
| 10 | 180 | 154 |
| 11 | 145 | 145 |

The resulting melting point was 147° C.

The extrusion mass was driven through a nozzle plate with 7 holes with a 4 mm diameter each on the casting head of the extruder. The extrudate was guided into the granulator with a water stream. The granulator consisted of two rolls for transport of the strands to a rotating blade. The pelletized premixture was then dried and screened in a flow bed drier (air temperature 35° C., residence time 20 seconds) to remove the fine portions (<2 mm) and coarse portions (>6 mm). The total yield was 80%. Dispersability is described in example 5.

Example 3

Pellets of Silicic Acid and Lubricant by Compacting of Components

A powder mixture was produced from 8.6 kg of micronized silicic acid with a specific pore volume of 0.95 ml/g, Malvern median particle size 5 microns and 11.4 kg erucic amide (Croda Universal Ltd. Hull/GB) by means of a 100 l Loedige batch mixer. After a mixing time of 3 minutes good homogeneity of the mixture and a bulk weight of roughly 300 g/l are achieved.

This powder mixture was metered with a throughput of 40 kg/h in a Hosokawa Bepex Compactor L 200/50 P. In this machine the powder was pressed between two compact particles with a 12 mm profile and with a compacting force of roughly 30 kN. Using the Hosokawa Bepex device then particles from 1 to 3 mm average size were achieved. The bulk density was increased from 300 g/l (for the powder mixture) to 520 g/l for pellets. These granulates were then supplied to a 300 mm twin screw extruder as in Example 1 in order to produce a polypropylene master batch with 5% by weight based on the silicic acid content. The results of the dispersability tests are given in FIG. 5.

Example 4

Comparison Example with Antiblocking Agents and Lubricants as Powder Via a Master Batch A master batch was produced from polypropylene (Solvay DV 001PF) and a mixture consisting of 43% pure amorphous silicic acid (specific pore volume 1.0 ml/g Malvern median particle size micron) and 57% erucic acid amide. The total concentration of the mixture was 5% by weight or 60 g/h. A twin screw extruder (Theyson TSK 30/40D) was used for production. The polypropylene power was metered into the first extrusion zone, the mixture of silica-erucic acid amide into the third extrusion zone. The extrusion conditions were as follows:

| | |
|---|---|
| Screw rotation speed | 300 1/min |
| Extruder screen | 200 mesh |
| Nozzle opening diameter | 4 mm |
| Number of openings | 2 |
| Throughput | 12 kg/h |
| Temperature profile (setting values) | |
| Zone 1 | Cooling |
| Zone 2 | 250° C. |
| Zone 3 | 250° C. |
| Zone 4 | 230° C. |
| Zone 5 | 220° C. |
| Zone 6 | 220° C. |
| Zone 7 | 210° C. |
| Zone 8 | 200° C. |
| Zone 9 | 200° C. |
| Zone 10 | 190° C. |
| Temperature of screen changer | |
| Zone 1 | 200° C. |
| Zone 2 | 200° C. |
| Nozzle temperature | 210° C. |

The extruded strands with a diameter of 4 mm were cooled in a water bath and then granulated in a granulator (strand granulator series 750/l) from Theyson. The dispersability is described in example 5.

Example 5

Dispersability

Dispersability tests were run to determine the quality of the dispersability of the silicic acid in the polyolefins. The compositions with silicic acid which were used as produced according to examples 1 to 4 in order to produce polypropylene film roughly 30 microns thick [sic].

On a twin screw extruder (Theyson TSK 30/40D) a master batch in polypropylene (Solvay HV 001PF) with an additive composition is produced in concentrations such that 5% by weight silicic acid were achieved. The polypropylene powder was metered into the first extrusion zone, the additive composition into the third extrusion zone. Extrusion conditions were as follows:

| | |
|---|---|
| Worm rotation speed | 300 1/min |
| Extruder screen | 200 mesh |
| Nozzle opening diameter | 4 mm |
| Number of openings | 2 |
| Throughput | 12 kg/h |
| Temperature profile (setting values) | |
| Zone 1 | Cooling |
| Zone 2 | 250° C. |
| Zone 3 | 250° C. |
| Zone 4 | 230° C. |
| Zone 5 | 220° C. |
| Zone 6 | 220° C. |
| Zone 7 | 210° C. |
| Zone 8 | 200° C. |
| Zone 9 | 200° C. |
| Zone 10 | 190° C. |
| Temperature of screen changer | |
| Zone 1 | 200° C. |
| Zone 2 | 200° C. |
| Nozzle temperature | 210° C. |

The extruded strands with a diameter of 4 mm were cooled in a water bath and then granulated in a granulator (strand granulator series 750/l).

A Kiefel extruder was used to produce a Gast polypropylene film with a silicic acid concentration of 2000 ppm. The master batch produced beforehand was diluted with polypropylene (Mantel K 6100) up to the desired concentration of 2000 pm. A film 40 microns thick was used in order to determine the number of "nibs" (undispersed silicic acid particles) compared to a blank trial without silicate particles.

Nibs >0.5 mm diameter were counted on a 20×5 cm sheet and then the values transferred to 1 m$^2$.

The evaluation was done against a standardized film series. The dispersability standards were assessed as follows:

Characteristic 1=very good, almost no surface faults
Characteristic 2=acceptable, few faults
Characteristic 3=not acceptable, several surface faults
Characteristic 4=poor, film surface is oversaturated with faults.

The film patterns which were produced from the additive composition with silicic acid as described in examples 1 to 4, led to the following results according to the evaluation:

| Example number | Characteristic | No. of "nibs"/m$^2$ |
|---|---|---|
| 1 | 1 | 300 |
| 2 | 1 | 200 |
| 3 | 4 | >80000 |
| 4 | 1 | 600 |
| Blank trial | 1 | 200 |

With respect to general use of the invention the contents of individual additives can vary widely. The concentration limits for some of the specially named additives in the granulate are preferably as follows:

Silicic acid: 20–41% by weight
Crodamide ER: 20–40% by weight
Irganox 1010: 5–20% by weight
Irgafos 168: 10–25% by weight
Ca-Stearate type M: 2–12% by weight The specific pore volume of the silicic acid was determined according to nitrogen sorption measurement with surface and pore volume measurement device ASAP 2400 from Fa. Micromeritics. The basis of this method is that porous solids such as silicic acid can adsorb gas molecules in their cavities. Conclusions can be drawn for the specific surface SA (m2/) and the specific pore volume PV (ml/g) from the plot of the amount of adsorbed gas (at a defined temperature) against pressure over the sample. In the ASAP 2400 the adsorbed amount of nitrogen is determined volumetrically as a function of the equilibrium partial pressure p/p0 at a temperature of 77° K. on the activated sample.

With respect to the state of filling of the pores and cavities, reference is made to the oil adsorption method which enables access to the critical pigment volume concentration. It is based on DIN EN ISO 787, Part 5. When the pores and cavities are overfilled a transition from powder to paste-like mass takes place with embedding of the porous particles.

by weight of the total composition, but using a volume which is at least 5% more (measured by the oil adsorption process) than that which is necessary to fill all pores of any silicic acid and the spaces between silicic acid particles and/or aluminosilicate particles;

(3) heating the combination of 2) to a melting temperature of organic additive (C);

(4) extruding the melted composition resulting from step (3) and (5) granulating the extruded material from (4).

2. Process of claim 1 wherein the components of (A), (B) and/or (C) are supplied separately to an extruder.

3. Process of claim 1 wherein a premixture of components of (A), (B) and/or (C) is supplied to an extruder and subsequently granulated.

4. A process of claim 1 wherein the extruded composition from (4) is granulated during (5) into particles and those particles are subsequently cooled in a fluidized bed.

5. A process of claim 1 wherein the extruded composition from (4) is granulated during (5) in water and the water is subsequently atomized in a fluidized bed.

6. Process of claim 1, wherein the organic additive (C) comprises one or more of the following components:
   i) lubricants from the group of fatty acid amides;
   ii) primary antioxidants from the group of sterically hindered phenols, secondary aryl amines;

Tabulation of example "Inventions versus prior art"

| Example | Description | Status | Delineation to other examples |
|---|---|---|---|
| No. 1 | silicic acid and erucic acid amide pellets *2) | Invention | Production by extrusion on lab. scale<br>two additives in final use 100% active *1)<br>good dispersability in polymer (see Ex. 5)<br>Product advantages: no dust, good flow property, etc. |
| No. 2 | Pellets of silicic acid and 4 diff. additives | Invention | Production by extrusion on production scale<br>all 5 additives in final use 100% active *1)<br>good dispersability in polymer (see Ex. 5)<br>Product advantages: no dust, good flow property, etc. |
| No. 3 | silicic acid and erucic acid amide pellets *2) | Prior art | Granulate production with current compaction process<br>two additives in final use 100% active *1)<br>poor dispersability in polymer (see Ex. 5)<br>Product advantages: no dust, good flow property, etc. |
| No. 4 | silicic acid and erucic acid amide powder mixture *2) | Prior art Blank trial | Powder mixture production with current mixer<br>two additives in final use 100% active *1)<br>good dispersability in polymer (see Ex. 5)<br>No product advantages: dust development, poor flow properties, etc. |
| No. 5 | Application-engineering test process for assessing product quality (dispersability) of examples 1–4 | | |

*1) No polymer or wax were used for pellet production (all components are active)
*2) all formulations (example no. 1, 3, 4) are identical

What is claimed is:

1. A process for producing granulated products comprising
    1) selecting a member of the group consisting of
        a) micronized silicic acid gel (A) with an average particle size from 2 to 15 microns, a specific pore volume from 0.3 to 2.0 ml/g, and a specific surface (BET) from 200 to 1000 m²/g;
        b) hydrated or dehydrated aluminosilicate (B) which contains sodium and/or potassium and/or calcium cations, with a particle size between 1 and 25 microns; and mixtures of a) and b);
    2) combining the member of 1) with an organic additive composition (C) in an amount of about 25 to about 95% iii) secondary antioxidants from the group of phosphorus compositions, thioesters, hydroxylamines;
    iv) antistatic agents from the group of ammonium salts, glycerin esters, anionic compounds;
    v) light stabilizers from the group of benzophenones, benzotriazols, sterically hindered amine light stabilizers;
    vi) flame retardants selected from the group consisting of halogenated organic compounds, metal hydrates, and mixtures of the same;
    vii) softeners selected from the group consisting of phthalates, monocarboxylic acid esters, and aliphatic dicarboxylic acid esters.

* * * * *